United States Patent [19]

Lokey

[11] 4,208,234

[45] Jun. 17, 1980

[54] HOSIERY BANDING APPARATUS

[75] Inventor: Burke P. Lokey, Wilbraham, Mass.

[73] Assignee: Westvaco Corporation, New York, N.Y.

[21] Appl. No.: 27,234

[22] Filed: Apr. 5, 1979

[51] Int. Cl.[2] .............................................. B32B 31/00

[52] U.S. Cl. ...................................... 156/351; 53/590; 156/361; 156/362; 156/443; 156/492

[58] Field of Search ............... 156/212, 215, 443, 492, 156/566, 542, 351, 361-364; 223/87; 53/590, 218

[56] References Cited

U.S. PATENT DOCUMENTS

| | | | |
|---|---|---|---|
| 3,322,600 | 5/1967 | Harrison et al. | 156/519 |
| 3,832,829 | 9/1974 | Stout | 53/590 |
| 3,886,026 | 5/1975 | Kienel | 53/218 X |
| 3,954,543 | 5/1976 | Messmer | 156/542 X |
| 4,092,204 | 5/1978 | Nesley | 156/492 X |
| 4,132,309 | 1/1979 | Shaylor | 223/87 X |

*Primary Examiner*—David A. Simmons

[57] ABSTRACT

An apparatus is disclosed for successively applying hosiery or the like articles with a label having pressure sensitive adhesive applied to one side thereof. The label comprises a cut and scored blank of paperboard or the like which is divided into sub-panels for forming an article suspending upper hook portion and an article enveloping lower banding portion. The apparatus comprises means for sequentially separating the labels from a carrier web and means for forming, at two separate forming stations, the article suspending upper portions and the article enveloping lower portions of the labels. The operation of the apparatus is controlled by an operator who places hosiery or the like articles on a partially formed label at the second forming station. Upon removal of a banded pair of hosiery or the like from the machine, the apparatus is reactivated to deliver additional labels to the first and second forming stations.

10 Claims, 1 Drawing Figure

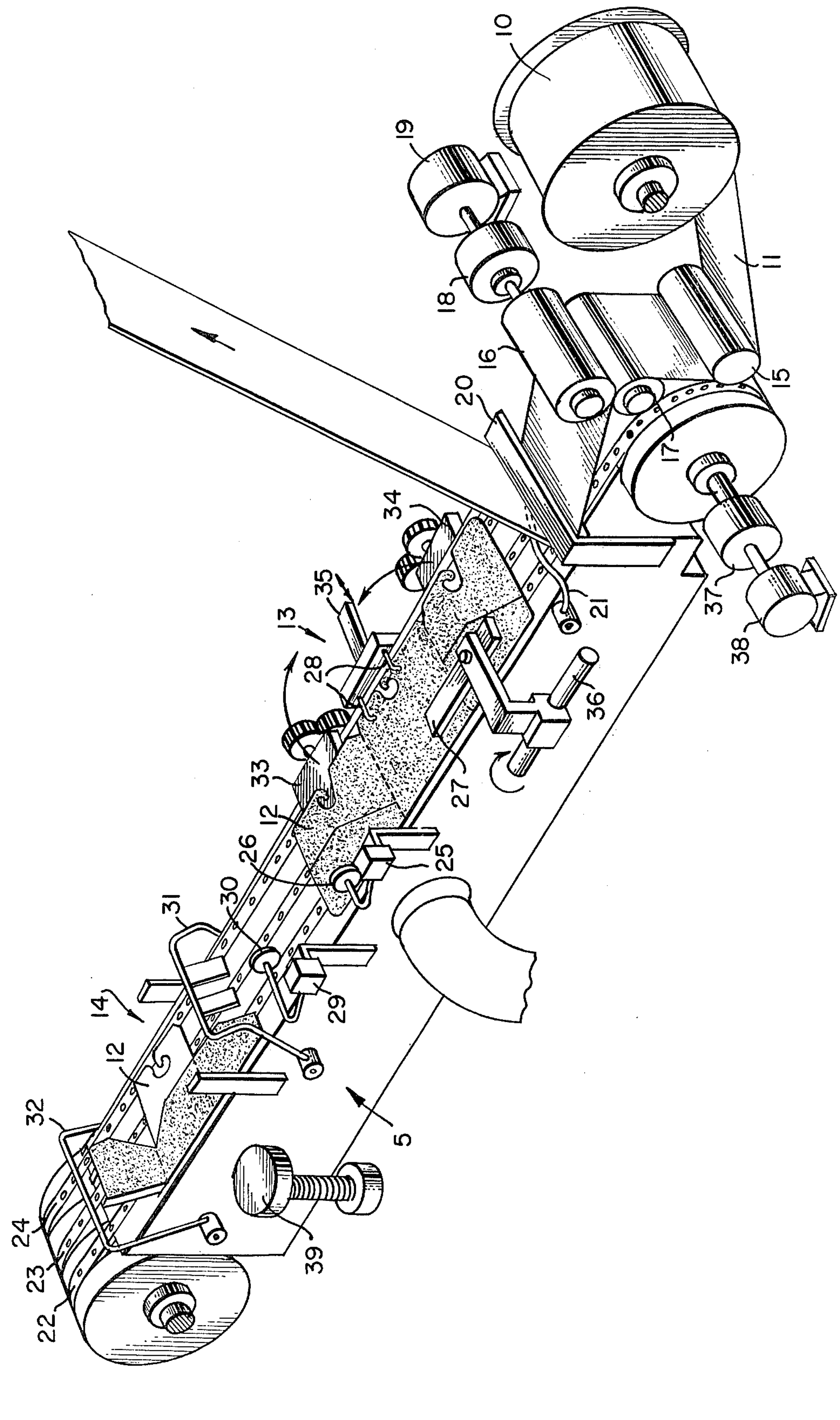
10
19
18
11
16
15
20
17
34
35
13
21
37
38
28
36
33
27
12
26
25
31
30
29
14
12
5
32
24
23
22
39

HOSIERY BANDING APPARATUS

BACKGROUND OF INVENTION

The present invention relates to a means for packaging hosiery or the like articles of merchandise. More particularly, the present invention is directed to a method and apparatus for mechanically wrapping a band or label, having a pressure sensitive adhesive applied to one side thereof, around hosiery. The apparatus of the present invention comprises an improvement to the hosiery banding machine disclosed in U.S. Pat. No. 3,886,026, and is designed specifically but not exclusively for applying bands substantially as shown in U.S. Pat. No. 4,132,309 to hosiery. Moreover, for the purpose of providing a complete description of the present invention, the disclosures of U.S. Pat. Nos. 3,886,026 and 4,132,309 are incorporated herein by reference.

SUMMARY OF INVENTION

The present invention comprises an improvement in the apparatus disclosed in U.S. Pat. No. 3,886,026, for applying a band or label to hosiery or the like. In particular, the present invention is intended for use with the HOOK-A-BAND hosiery labels disclosed in U.S. Pat. No. 4,132,309.

For this purpose, the apparatus shown in U.S. Pat. No. 3,886,026, (the disclosure of which is incorporated herein by reference), is spread apart to provide space for the installation of a hook forming station. More particularly, the apparatus of the present invention utilizes the means shown in U.S. Pat. No. 3,886,026 for stripping labels from the carrier web, and utilizes substantially the same means as shown in the aforementioned patent for the hosiery banding step, but incorporates between these two means a new hook forming station for the labels.

DETAILED DESCRIPTION

The apparatus of the present invention is illustrated generally in the FIGURE of the drawing as including a supply roll 10 for a carrier web 11 which has releasably adhered thereto a plurality of serially arranged labels 12. The labels 12 are adhered to the web 11 by a suitable pressure sensitive adhesive that is capable of sticking to itself and to items placed in contact therewith, and the labels are preferably of the form more fully disclosed in U.S. Pat. No. 4,132,309. The supply roll 10 is adapted to be freely rotatable on its axis so that as the web 11 is unwound, individual labels may be stripped therefrom and delivered to the forming stations 13 and 14. The web 11, with its labels 12 facing downwardly, is drawn from the supply roll 10, around a turning roll 15 and between a pair of feed rolls 16,17. From the feed rolls 16,17, the web is fed to a label separating device 20 which comprises a bar, rod or the like. The label separating device 20 is positioned transversely of the carrier web 11 so that the web may be drawn around the bar, rod or the like where the individual labels 12 are peeled from the web. After the label separating device 20, the carrier web is then directed in substantially a reverse direction toward a take up reel (not shown).

The label separating means 20 also includes a wand or other label stripping means 21 which insures that the labels 12 are properly stripped from the web 11. After stripping, the labels 12 are delivered with their adhesive coated surface facing upwardly along a horizontal path of travel through the two forming stations 13 and 14.

The means for transporting and delivering the labels 12 to the stations 13 and 14 comprises a plurality of endless belts 22,23,24, substantially as more fully disclosed in U.S. Pat. No. 3,886,026. Further, as disclosed in the aforementioned patent, the labels 12 are maintained on the belts 22,23,24 by a vacuum means which draws the labels 12 into substantially firm contact with the upper surfaces of the belts. In this manner, the labels are transported to the first forming station 13, where the hook portion of the label is formed, and then to the second forming station 14 where the hosiery or other articles are associated with the banding portion of the label. In operation, a pair of microswitches 25 and 29 are employed for feeding labels to the first forming station 13 and for stopping and retaining the labels 12 at each forming station 13,14 as the hook portions and hosiery banding portions are formed.

In operation, a label 12 is transported to the first forming station 13 where microswitch 25 detects its presence and actuates a pair of hold down devices for retaining the label in position while the hook portion is formed. After the hook forming panels of the label 12 are folded, the partially formed label is then transported to forming station 14 where the machine operator causes the hosiery or like articles to be banded. For this purpose, the label is stopped at forming station 14 where the operator places a pair of hosiery on the partially formed label substantially as disclosed in U.S. Pat. No. 3,886,026. Thus, the product banding portion of the apparatus of the present invention operates in substantially the same manner as the machine disclosed in the aforementioned patent. Accordingly, the novelty of the present invention lies in the addition of the hook forming station 13 between the label stripping device 20,21 and the product banding station 14. At the product banding station 14, a second microswitch 29 controls the operation of the label transporting tapes 22,23,24. Subsequently, when the operator removes a pair of banded hosiery from the forming station 14, the feed roll drive and the main machine drive for the transport tapes 22,23,24 are reengaged to transport successively following labels 12 to the forming stations 13 and 14. In operation, the label folding steps at each forming station may be arranged to occur simultaneously or selectively as desired.

As a label 12 is fed from the feed rolls 16,17 to the label stripping device 20,21, it is stripped from web 11 and transported to the forming station 13. At the forming station 13, the leading edge of the label 12 engages the sensor 26 of microswitch 25. When this occurs the following actions take place. First, the band clamp 27 is actuated by mechanism 36 to move downwardly into contact with the adhesive coated side of the label to retain the label in place. Simultaneously, a pair of hold down hooks 28 are moved from the side of the machine by mechanism 35 into contact with an edge of the label, and, the feed roll clutch 18 is disengaged while a brake on the feed roll drive motor 19 is engaged to halt the feeding of the next successive label. The band clamp 27 and hold down hooks 28 stop the label 12 and retain it in position at forming station 13 despite the fact that the transport tapes 22,23,24 continue to run.

When a label as shown in U.S. Pat. No. 4,132,309 is being applied, the band clamp 27 is arranged to extend over the fold line connecting the central portion of the label to one of the product encompassing lower flap portions of the label, while the first microswitch sensor rests on and retains the remaining product encompassing lower flap portion of the label in position. In addition, the hold down hooks 28 are arranged to engage the central portion of the label near the fold lines which connect the central portion thereof to the upper, hook forming flaps of the label. Since the band clamp 27, hold down hooks 28 and microswitch sensor 26 are each in contact with the adhesive coated surface of the label, they tend to stick thereto. However, in the preferred embodiment of the present invention, each of these elements is coated with a polymer such as a TEFLON resin to achieve an easy release of these elements from the label.

The hook portions of the label are folded at forming station 13 as follows. With the band clamp 27, sensor 26 and hold down hooks 28 in position, the first hook flap is folded around by element 34 into contact with the central portion of the label. Then, after the element 34 is returned to its original position, the second hook flap is folded around by element 33 and into contact with the first hook flap. At this point, the pressure sensitive adhesive applied to the label flap portions causes these portions to become adhered together to form the hook portion of the label. In addition, even with a relatively non-stick surface applied to the band clamp element 27, the hold down hooks 28 and the sensor 26, they also tend to stick to the pressure sensitive surface of the label. Thus, the hook forming process at forming station 13 includes a slight time delay which permits the folding element 33 for the second hook flap to hold the partially formed label against the vacuum belts while the band clamp 27 and hold down hooks 28 are released. In this regard, since the hold down hooks 28 are essentially trapped between the hook forming flaps of the label, they are released at an angle of approximately 45 degrees so that they are pulled from between the hook flaps as they lift up. Subsequently, after the hold down devices are removed, the folding element 33 is then returned to its original position.

The use of the folding element 33 to hold the label in place during the formation of the hook portion is essential, since, depending upon the basis weight of the material used for the label, the vacuum system cannot always retain the label in place. Moreover it is necessary to stop the label and retain it in precise position in the forming station 13 for absolute reliability. In this regard, the product banding flaps must be restrained during the formation of the hook portion of the label since the adhesive surface forms a film over the cut lines dividing the hook flaps from the product banding flaps which is sometimes difficult to break. The use of a non-contact sensor such as an electric eye or air jet could be used in place of sensor 26. However, any substitution would increase the cost of the machine and would require the addition of another means for restraining the first product banding flap during formation of the hook portion of the label.

During the time that the hook portion of the label is being formed, the machine operator is banding a pair of hosiery at the second forming station 14 using the preceding partially formed label. After the machine operator removes the banded hosiery from the machine, the clutch 37 for the main machine drive 38 is reengaged to transport successively, a new label to the first forming station 13 and the partially formed label from forming station 13 to the product banding station 14.

The transport belts 22,23,24 that are driven by the main machine drive 38 are actuated by two microswitches wired in parallel. The system timer actuated a timer microswitch (not shown) until the partially formed label trips the label positioning microswitch 29 and then releases the timer microswitch. The label positioning microswitch 29 includes a sensor 30 which rides on the surface of the label until such time that the sensor 30 drops from the trailing end of the label. When the sensor 30 assumes its lowered position, the belts remain actuated until the label moves into its product banding position at forming station 14. At this point, the machine is ready to receive and band a pair of hosiery or other product. This portion of the banding machine is substantially unchanged and operates in general as more fully described in U.S. Pat. No. 3,886,026. Briefly, the banding sequence occurs as follows. A pair of hosiery or the like is placed on the partially formed label in the banding station 14 and an air switch 39 is actuated. The air switch 39 is more-or-less automatically actuated by the operator's hand when a pair of hosiery is placed on the label. This action initiates the following cycle. The rear flap lifters (not shown) rise and the rear folding wire 31 is rotated counterclockwise to urge the trailing flap of the label over and on top of the hosiery (not shown). After the rear folding wire 31 is returned to its original position, the rear flap lifters are retracted. Next, the front folding wire 32 is actuated to rotate clockwise and thereby urge the leading flap of the label, which is elevated to a raised position by the stationary front flap lifters (not shown), over and into contact with the previously folded trailing flap. In this manner, the pressure sensitive adhesive on the label adheres the hosiery to the label and the banding flaps of the label to one another.

After the leading flap is secured in place, the front folding wire 32 is returned to its original position and the hosiery with label attached is removed from the machine. This action releases the air switch 39 and returns the timer system to its start position. Simultaneously, the main drive 38 of the apparatus is restarted and clutch 37 is engaged to actuate the transport belts 22,23,24. As this activity is taking place, the label that was in forming station 13 is moved forward to the banding station 14 while the feed roll drive 18,19 feeds a new label to the hook forming station 13 and a new banding cycle begins.

The flap folding elements are arranged to operate either simultaneously or selectively as desired. For instance, the flap folding elements 31 and 34 may be operated simultaneously, then the folding elements 32 and 33 may be actuated together. Alternatively, the hook folding elements 33,34 may be operated on a different schedule from the band folding elements 31,32.

Accordingly, it may be seen that the present invention provides a means whereby hosiery banding labels substantially as disclosed in U.S. Pat. No. 4,132,309 may be effectively formed and applied to hosiery or other products. The present invention provides a means whereby the label can be stopped and retained in position and then released for further transport without disrupting the position of the label on the apparatus. In addition, the invention provides an effective hold down mechanism for the central portion of the label for insuring straight folds along the score lines of the label. Moreover, the invention provides a means for keeping the banding flaps from being folded when the hook forming flaps are folded.

From the above, it will be apparent that the apparatus of the present invention is substantially automatic once the machine is in operation. The operator needs only to place an article to be banded on the partially completed label at the banding station, hold it in position during the folding operation and then remove the article and applied label. During this procedure, the apparatus automatically delivers labels to the hook forming station 13, forms the hook portion of the label and delivers the partially formed labels to the product banding station 14. Thus, while a preferred embodiment of the invention has been disclosed, the invention herein should be limited only by the scope of the claims appended hereto.

I claim:

1. An apparatus for successively applying labels having an adhesive coated surface and releasably adhered to a carrier web to products intermittently presented thereto wherein said labels each comprise a central portion having hook forming flaps and product banding flaps foldably attached thereto, said apparatus comprising:

(a) means for sequentially separating the labels from the carrier web and for arranging the labels with their adhesive coated side up on said apparatus;

(b) means for transporting the labels on said apparatus to a first forming station and then to a second forming station;

(c) means for retaining the labels in position at the first forming station while the hook forming flaps of the labels are folded to form partially formed labels;

(d) means for retaining the partially formed labels at the second forming station while the product banding flaps of the labels are folded to band products placed thereupon; and, (e) means responsive to the banding of products at said second forming station for transporting a new label to said first forming station and a partially formed label to said second forming station.

2. The apparatus of claim 1 wherein a first label sensing means is located adjacent to said first forming station for sensing the presence of a label delivered to said first forming station, for stopping the delivery of further labels thereto and for holding in place one of the product banding flaps of said label while the hook portion of the label is formed.

3. The apparatus of claim 2 wherein the means for retaining a label in position at said first forming station comprises a band clamp which is actuated by said first label sensing means for holding in place the central portion and the other product banding flap of said label.

4. The apparatus of claim 3 wherein the means for retaining a label in position at said first forming station further comprises a pair of hold down hooks which are actuated by said first label sensing means for engaging the central portion of said label near the foldable attachments of said hook forming flaps to said central portion.

5. The apparatus of claim 4 wherein a pair of flap folding elements are located at said first forming station for alternately folding the hook flaps of a label over and into contact with one another for forming the hook portion of the label.

6. The apparatus of claim 5 wherein one of said flap folding elements is arranged to retain the partially formed label in position while said band clamp and hold down hooks are released from said label and prior to the time that said partially formed label is transported to said second forming station;

7. The apparatus of claim 6 wherein a second label sensing means is located prior to said second forming station for sensing the presence of a partially formed label delivered to said second forming station and for stopping the delivery of additional partially formed labels thereto.

8. The apparatus of claim 7 wherein a pair of flap folding elements are located at said second forming station for alternately folding the product banding flaps of a label over and into contact with products placed on said partially formed label.

9. The apparatus of claim 8 wherein the flap folding elements at said second forming staion are actuated by an operator controlled switch located adjacent to said second forming station which also controls the means for transporting the labels on said apparatus.

10. An apparatus for successively applying serially arranged labels having an adhesive on one surface and releasably adhered to a carrier web of indeterminate length to products intermittently presented thereto wherein said labels each comprise a central portion having hook forming flaps and product banding flaps foldably attached thereto, said apparatus comprising:

(a) means around which the carrier web is drawn for sequentially separating the labels therefrom and for arranging the labels with their adhesive coated surface up on said apparatus;

(b) means for transporting the separated labels to a first forming station and then to a second forming station, said means comprising a plurality of vacuum belts arranged on said apparatus and including a drive means for said vacuum belts;

(c) a first label sensing means located adjacent to said first forming station for sensing the presence of a label delivered to said first forming station, for stopping the delivery of additional labels thereto and for holding in place one of the product banding flaps of said label;

(d) means for retaining a label at said first forming station comprising a band clamp and a pair of hold down hooks which are actuated by said first label sensing means to move into contact with the adhesive coated surface of said label and hold the central label portion and the other product banding flaps against any movement of said transport belts;

(e) a pair of flap folding elements located at said first forming station for alternately folding the hook flaps of said label over and into contact with one another to form the hook portion of said label and for holding said partially formed label in position when the band clamp and hold down hooks are removed from the label;

(f) a second label sensing means located prior to said second forming station for sensing the presence of a partially formed label delivered to said second forming station and for stopping the drive means for said transport belts to prevent the delivery of additional partially formed labels thereto;

(g) a second pair of flap folding elements located at said second forming station for alternately folding the product banding flaps of a label over and into contact with products placed on said partially formed label; and, (h) an operator controlled switch located adjacent to said second forming station for controlling the action of said second pair of flap folding elements and for engaging the drive means for said transport belts to deliver another label to said first forming station and to transport the next partially formed label to said second forming station.

* * * * *